UNITED STATES PATENT OFFICE.

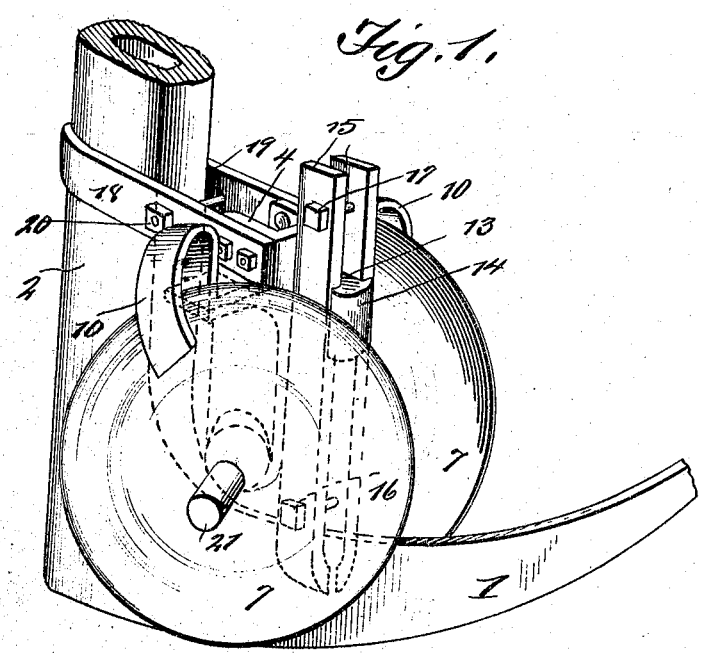
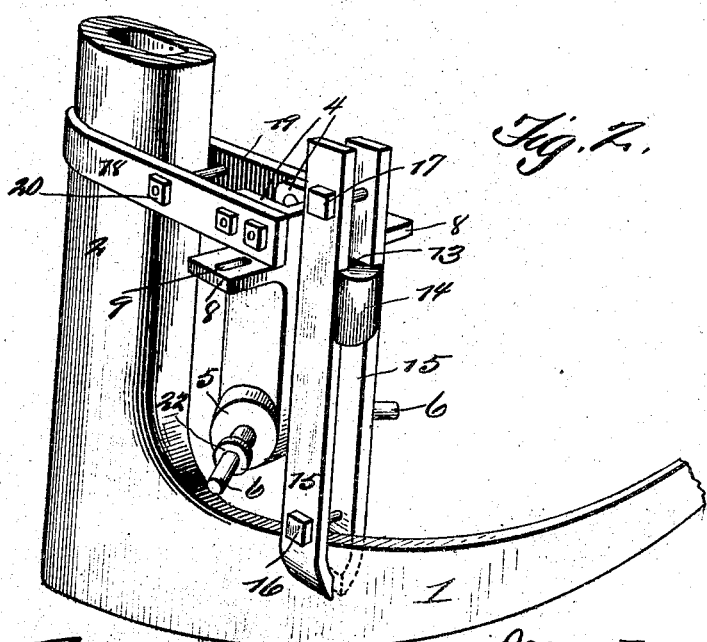

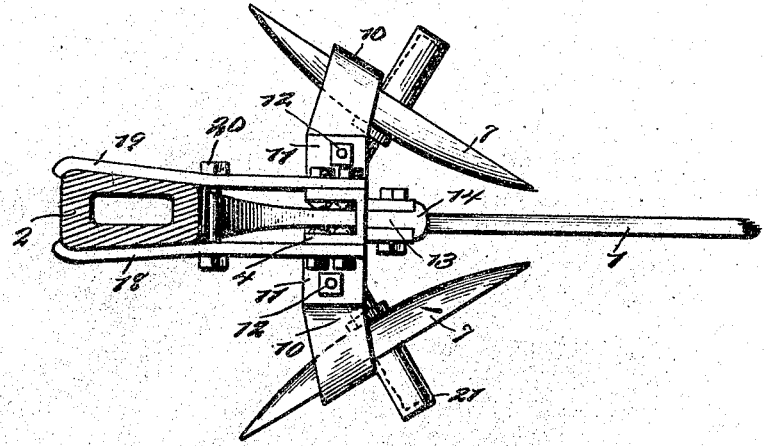
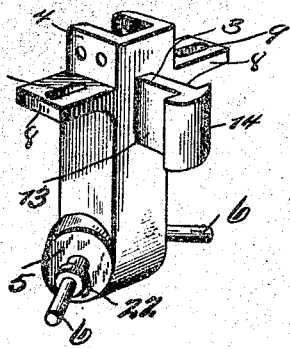

OSCAR F. ORNDOFF AND LAURITS T. RASMUSSEN, OF COUNCIL BLUFFS, IOWA.

FURROW-OPENER.

No. 885,641.

Specification of Letters Patent.

Patented April 21, 1908.

Application filed November 5, 1907. Serial No. 400,821.

*To all whom it may concern:*

Be it known that we, OSCAR F. ORNDOFF and LAURITS T. RASMUSSEN, citizens of the United States, residing at Council Bluffs, in the county of Pottawattamie and State of Iowa, have invented certain new and useful Improvements in Furrow-Openers, of which the following is a specification.

This invention pertains to certain new and useful improvements in furrow openers, of the type which are attached to and used in connection with planters.

The object of this invention is to increase the efficiency and utility of attachments of this character, and to generally improve and simplify the construction, and to provide a thoroughly practical contrivance which will perform its functions accurately and positively.
Other and further objects will manifest themselves in the following specification, and in the drawings, in which latter like characters of reference denote similar parts throughout the several views.
Referring to the drawings, Figure 1, is a view in perspective showing the invention applied to the shoe of a planter, the shoe being but partly shown. Fig. 2, is a like view, the scrapers and disks however, being omitted to more closely disclose the construction of the frame-work, Fig. 3, is a top plan view of Fig. 1, and Fig. 4, is a detail view in perspective depicting the frame element which supports the scrapers and the disks in detached position.

In the drawings 1, designates the shoe of a planter which has the well known and usual association with the seed tube 2, to which two elements the invention is applied.
As more clearly illustrated in Fig. 4, the frame element 3, embodies a body portion 4, which for the sake of lightness is formed U-shape in cross section. At its lower end this body is formed with enlargements or bosses 5, which serve the purpose of providing rigid and substantial supports for the stub axles 6, on which the disks 7, are mounted and carried. These disk axles have an angular disposition with respect to the body sides so as to cause the disks to form an acute angle with one another at the front or forward part of the shoe 1, for the obvious purpose, as is well known in the art, to cause the furrow to be widened in gradual manner.
At the top portion of the body, on each side thereof, is provided an outstanding horizontal lug or projection 8, each of which is provided with an elongated slot 9. These lugs or projections provide seats for the scrapers 10, the latter each comprising a body of strip metal of general U-shape so as to allow the free end thereof to project downwardly and engage the outer side of the disks at points inward of the periphery thereof. The opposite ends of these scrapers are turned outwardly at approximate right angles as at 11, and engage the lugs or projections 8, being held thereon by nuts and bolts 12, which latter extend through slots 9, and are movable along the lengths thereof, which enables the free ends of the scrapers to be adjusted towards or away from the disks as desired or found necessary.

The front face of body 4, is formed with a forwardly projecting lug 13, formed with a head 14, which projects beyond each side thereof.

15, 15, designates a pair of vertical bars which at their lower ends are suitably formed to engage the shoe 1, these bars being arranged on opposite sides of the shoe and on opposite sides of the lug 13, each being engaged by the front face of the body 4, and the head 14, by means of which the bars are held rigidly against transverse movement. Bolts and nuts 16 and 17, serve to effectually clamp these bars to the shoe 1, the headed lug, and body 4. Body 4, is also assisted in being stationarily related to the shoe and seed tube by means of a pair of horizontal bars 18, and 19, which latter at their rear ends are shaped to embrace and snugly engage on opposite sides of seed tube 2, to which they are firmly clamped in unison by bolt and nut 20. The front ends of bars 18 and 19, are shown seated on lugs 8 and individually secured to the corresponding sides of body 4, by bolts, as illustrated. Thus body 4, is rigidly supported or suspended, and may, as is manifest be raised or lowered, at will, with respect to shoe 1, by mere unloosening of bolts 17 and 20.

The disks are depicted as formed with hollow hubs 21, which receive the free ends of stub axles 6, the disks being held in relative position on their axles by virtue of being engaged by the scrapers 10.

By use of washers between the inner faces of the disks and the bearing points 22, of axles 6, the disks may be adjusted inwardly or outwardly with respect to the shoe as desired.

The invention, as is manifest, not only provides an attachment which is rigidly related to the shoe, but further one which is serviceable and which embodies but few parts. Moreover, the extreme simplicity involved in its operative securement to the shoe, adds to its general desirability.

Having thus fully described our invention, what we claim as new and desire to secure by Letters Patent is:—

1. In combination with the shoe of a planter, a furrow opener embodying a frame element carrying disks, a headed lug projecting outwardly from the front face of said element, a horizontal lug on each side of said element, a scraper secured to each lug, and means to secure said element with respect to said shoe.

2. In combination with the seed tube and shoe of a planter, a furrow opener embodying a frame element carrying disks, a headed element projecting outwardly from the front face of said frame element, a pair of bars on opposite sides of said headed element disposed between the front face of the frame element and the head of the headed element so as to be held against outward movement by said head, means to clamp said bars to said headed element and to the shoe, and bars secured to the upper end of the frame element and to the seed tube of the shoe and clamped to each.

3. In combination with the shoe and seed tube of a planter, a frame element of U-shape in cross section, an outwardly projecting lug on each side of said frame element adjacent the top thereof, disks carried by the frame element, a scraper secured to each lug, horizontal bars on opposite sides of said frame element seating on the top faces of said lugs, means to secure said bars to said frame element and to the seed tube, a headed lug projecting outwardly from the front face of said frame element, a pair of vertical bars engaged between the head of said lug and the front face of said frame element, and means for clamping said vertical bars to said headed lug and to the shoe.

In testimony whereof we have signed our names to the specification in the presence of two subscribing witnesses.

OSCAR F. ORNDOFF.
LAURITS T. RASMUSSEN.

Witnesses:
ANNA BURRESS,
HELEN V. REAP.